O. L. BARTHOLOMEW.
RAT AND MOUSE EXTERMINATOR.
APPLICATION FILED OCT. 7, 1918.
1,309,606.
Patented July 15, 1919.
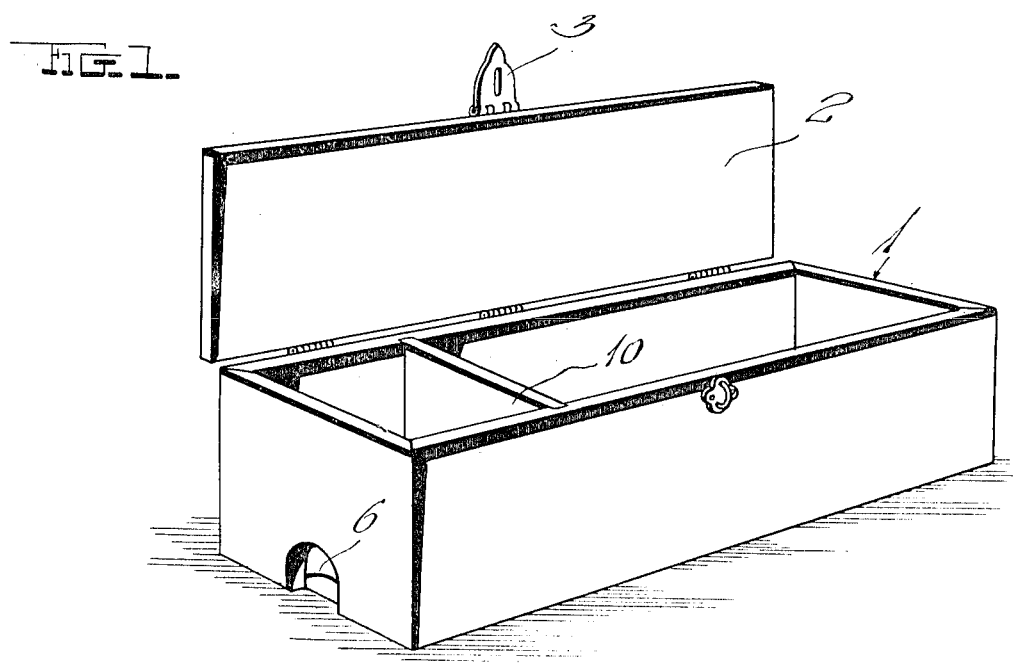
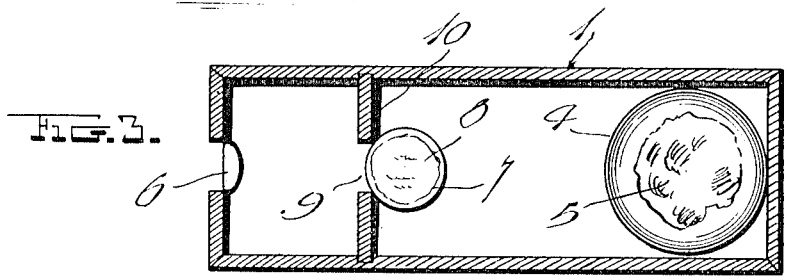
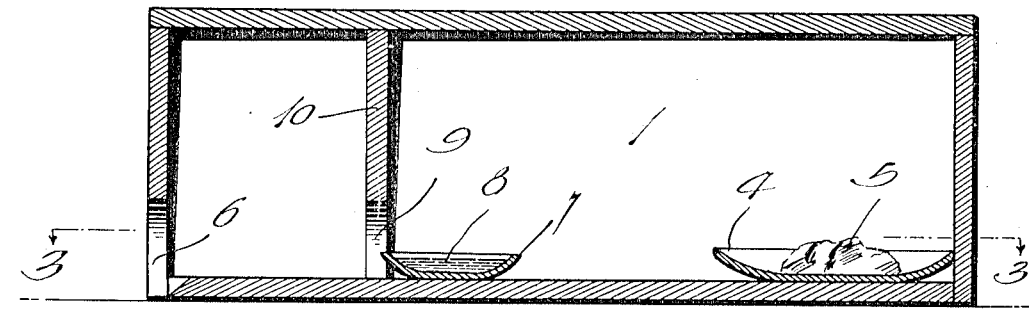
Witness
H. Woodard
Inventor
O. L. Bartholomew
By H. B. Wilson & Co.
Attorneys

UNITED STATES PATENT OFFICE.

OSCAR L. BARTHOLOMEW, OF GRAND RAPIDS, MICHIGAN.

RAT AND MOUSE EXTERMINATOR.

1,309,606.   Specification of Letters Patent.   Patented July 15, 1919.

Application filed October 7, 1918. Serial No. 257,243.

*To all whom it may concern:*

Be it known that I, OSCAR L. BARTHOLOMEW, a citizen of the United States, residing at Grand Rapids, in the county of Kent and State of Michigan, have invented certain new and useful Improvements in Rat and Mouse Exterminators; and I do declare the following to be a full, clear, and exact description of the invention, such as will enable others skilled in the art to which it appertains to make and use the same.

My invention has for its object to provide a simple and inexpensive, yet a highly efficient and in every way desirable device for exterminating rats, mice, etc., provision being made whereby the vitriol or other posion used is inaccessible to cats and dogs.

With the foregoing object in view, the invention resides in the novel arrangement of parts hereinafter fully described and claimed, and shown in the accompanying drawing.

Figure 1 is a perspective view of the device.

Fig. 2 is a central vertical longitudinal section, and,

Fig. 3 is a horizontal section on the plane of the line 3—3 of Fig. 2.

In the drawing above briefly described, the numeral 1 designates a box of suitable size and shape and constructed of any preferred material, said box being preferably provided with a hinged cover 2 having an appropriate fastener 3. In one end of the box 1 a container 4 is secured to hold a quantity of food as indicated at 5, while in the opposite end of said box is a doorway 6 through which the rats or other animals may enter and leave. A foot pan 7 is disposed between the container 4 and the doorway 6, and is adapted to contain a quantity of vitriol 8 or other similar poison. The foot pan 7 is in the path which the animal must take in walking from the doorway 6 to the food container 4 and it thus follows that he must step into the contents of said foot pan before starting to eat the food 5. By the time a small quantity of the food has been eaten the vitriol begins to burn the animal's feet, with the result that he licks the latter, so that his tongue and mouth become affected by the vitriol. Thus instead of eating more the animal leaves the box and in time will be killed by the action of the poison.

In order to prevent cats, dogs and other small animals from possibly inserting their paws into the foot pan 7, the latter is spaced inwardly from the doorway 6 such a distance as to be inaccessible, even though the dog or cat inserts his paw a considerable distance through the doorway, and in order that the rats or the like may be forced to step into the foot pan, the latter is located substantially in a second doorway 9 formed through a partition 10 in the box 1. By the provision of the partition and its doorway, it is obvious that the animals cannot possibly take any other course to the food container 4, than the one which will cause them to step into the container 7.

The device has been tested in actual use and has proven highly efficient for the purposes intended. Since probably the best results are obtained from the details disclosed, they may be followed but within the scope of the invention as claimed, considerable latitude is allowed for making such minor changes as occasion may dictate.

I claim:

In an exterminator for rats and other small animals, an elongated rectangular box provided with a removable top, a transverse partition in said box near one of its ends, said partition extending from top to bottom and from side to side of said box and dividing it into a small and a large compartment, said one end of the box and said partition each having in its lower edge an entrance opening, a food pan in said large compartment and located at the far end of the latter, and a foot pan in said large compartment, located substantially in the entrance opening of said partition, said foot pan containing a deadly poison which will burn the animal's feet.

In testimony whereof I have hereunto set my hand,

OSCAR L. BARTHOLOMEW.

Witnesses:
 WALTER F. CORBIN,
 CLARA BARTHOLOMEW.